(12) United States Patent
Haruta et al.

(10) Patent No.: US 8,685,305 B2
(45) Date of Patent: Apr. 1, 2014

(54) PROCESS FOR PRODUCTION OF HEAT-SHRINKABLE POLYESTER FILM, HEAT-SHRINKABLE POLYESTER FILM AND PACKAGES

(75) Inventors: Masayuki Haruta, Inuyama (JP);
Masatoshi Hashimoto, Inuyama (JP);
Masakazu Iwasaki, Inuyama (JP);
Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 238 days.

(21) Appl. No.: 12/679,248

(22) PCT Filed: Sep. 24, 2008

(86) PCT No.: PCT/JP2008/067144
§ 371 (c)(1),
(2), (4) Date: Mar. 19, 2010

(87) PCT Pub. No.: WO2009/041408
PCT Pub. Date: Apr. 2, 2009

(65) Prior Publication Data
US 2010/0247845 A1    Sep. 30, 2010

(30) Foreign Application Priority Data

Sep. 25, 2007  (JP) ................. 2007-246701

(51) Int. Cl.
*B29C 55/00* (2006.01)
*B29C 71/02* (2006.01)
*B65B 53/00* (2006.01)

(52) U.S. Cl.
USPC .......... 264/290.2; 264/210.1; 264/210.7; 264/211.13; 264/211.2; 264/235; 264/235.6; 264/235.8; 264/237; 264/289.6; 264/294; 264/346; 264/348; 428/34.9; 428/98; 428/480; 525/444

(58) Field of Classification Search
None
See application file for complete search history.

(56) References Cited

U.S. PATENT DOCUMENTS

| | | | |
|---|---|---|---|
| 4,059,667 A * | 11/1977 | Pangonis | 264/216 |
| 4,582,752 A | 4/1986 | Duncan | |
| 4,939,232 A * | 7/1990 | Fukuda et al. | 528/272 |
| 4,963,418 A * | 10/1990 | Isaka et al. | 428/34.9 |
| 4,996,291 A * | 2/1991 | Yoshinaka et al. | 528/272 |
| 5,407,752 A * | 4/1995 | Fukuzumi et al. | 428/480 |
| 6,090,898 A | 7/2000 | Tsunekawa et al. | |
| 6,231,958 B1 | 5/2001 | Kim et al. | |
| 6,270,866 B1 * | 8/2001 | Okuda et al. | 428/35.1 |
| 6,342,281 B2 * | 1/2002 | Hayakawa et al. | 428/35.2 |
| 6,383,627 B2 | 5/2002 | Hashimoto et al. | |
| 6,413,596 B1 * | 7/2002 | Okuda et al. | 428/34.7 |
| 6,524,669 B2 | 2/2003 | Ito et al. | |
| 6,623,821 B1 | 9/2003 | Kendig | |
| 6,720,085 B2 | 4/2004 | Ito et al. | |
| 6,761,966 B2 | 7/2004 | Ito et al. | |
| 6,939,616 B2 * | 9/2005 | Hayakawa et al. | 428/480 |
| 6,958,178 B2 | 10/2005 | Hayakawa et al. | |
| 7,001,651 B2 | 2/2006 | Hayakawa et al. | |
| 7,008,698 B2 * | 3/2006 | Marlow et al. | 428/480 |
| 7,189,451 B2 | 3/2007 | Kiehne et al. | |
| 7,279,204 B2 | 10/2007 | Ito et al. | |
| 7,303,812 B2 | 12/2007 | Hashimoto et al. | |
| 7,344,765 B2 | 3/2008 | Hayakawa et al. | |
| 7,829,655 B2 | 11/2010 | Endo et al. | |
| 7,960,028 B2 | 6/2011 | Inagaki et al. | |
| 7,980,407 B2 | 7/2011 | Shimada | |
| 8,206,797 B2 | 6/2012 | Haruta et al. | |
| 8,232,351 B2 | 7/2012 | Mukoyama et al. | |
| 2001/0014729 A1 * | 8/2001 | Hayakawa et al. | 528/272 |
| 2002/0090502 A1 * | 7/2002 | Ito et al. | 428/304.4 |
| 2003/0050430 A1 | 3/2003 | Ito et al. | |
| 2003/0165658 A1 | 9/2003 | Hayakawa et al. | |
| 2003/0165671 A1 | 9/2003 | Hashimoto | |
| 2003/0170427 A1 | 9/2003 | Ito et al. | |
| 2005/0196563 A1 | 9/2005 | Ito et al. | |
| 2005/0236731 A1 | 10/2005 | Hayakawa et al. | |
| 2006/0008638 A1 | 1/2006 | Kiehne et al. | |

(Continued)

FOREIGN PATENT DOCUMENTS

| | | |
|---|---|---|
| EP | 1 264 680 B1 | 12/2002 |
| EP | 1 340 609 A2 | 9/2003 |

(Continued)

OTHER PUBLICATIONS

Japanese Patent Office, International Search Report in International Patent Application No. PCT/JP2008/067144 (Dec. 16, 2008).

(Continued)

*Primary Examiner* — Jeffrey Wollschlager (74) *Attorney, Agent, or Firm* — Leydig, Voit & Mayer, Ltd.

(57) ABSTRACT

The invention aims at providing a heat-shrinkable polyester film which is excellent in tearability along perforations and in break resistance after storage when used as labels of beverage bottles. The invention relates to a heat-shrinkable polyester film which is made of a polyester resin comprising ethylene terephthalate as the main constituent and containing at least 13 mol % of at least one monomer capable of forming an amorphous component in the whole polyester resin component and which has specific heat shrinkage characteristics and exhibits specific mechanical characteristics after heat shrinking treatment. The film can be produced by a sequential biaxial orientation process comprising longitudinal orientation step, intermediate heat treatment step, positive cooling step, transverse orientation step, and final heat treatment step.

2 Claims, 1 Drawing Sheet

(56) References Cited

U.S. PATENT DOCUMENTS

| | | | |
|---|---|---|---|
| 2006/0057346 A1* | 3/2006 | Ito et al. | 428/220 |
| 2007/0104931 A1* | 5/2007 | Ito et al. | 428/220 |
| 2009/0270584 A1 | 10/2009 | Endo et al. | |
| 2009/0304997 A1 | 12/2009 | Haruta et al. | |
| 2010/0093965 A1 | 4/2010 | Yamamoto et al. | |
| 2010/0100363 A1 | 4/2010 | Kurnik | |
| 2011/0008607 A1 | 1/2011 | Haruta et al. | |
| 2012/0043248 A1 | 2/2012 | Haruta et al. | |

FOREIGN PATENT DOCUMENTS

| | | |
|---|---|---|
| EP | 1 614 536 A2 | 1/2006 |
| EP | 2 058 357 A1 | 5/2009 |
| EP | 2 208 609 A1 | 7/2010 |
| JP | 63-236623 A | 10/1988 |
| JP | 5-254015 A | 10/1993 |
| JP | 08-244114 A | 9/1996 |
| JP | 2000-254968 A | 9/2000 |
| JP | 2001-288283 A | 10/2001 |
| JP | 2002-363312 A | 12/2002 |
| JP | 2003-170498 A | 6/2003 |
| JP | 2003-236930 A | 8/2003 |
| JP | 2003-326658 A | 11/2003 |
| JP | 2004-34451 A | 2/2004 |
| JP | 2004-351734 A | 12/2004 |
| JP | 2005-066933 A | 3/2005 |
| JP | 2005-194466 A | 7/2005 |
| JP | 2006-45317 A | 2/2006 |
| JP | 2006-181899 A | 7/2006 |
| JP | 2006-212926 A | 8/2006 |
| JP | 2006-233092 A | 9/2006 |
| JP | 2007-016120 A | 1/2007 |
| JP | 2007-056156 A | 3/2007 |
| JP | 2007-152943 A | 6/2007 |
| KR | 10-0538200 B1 | 12/2005 |
| WO | WO 2005/012403 A1 | 2/2005 |
| WO | WO 2007/145231 A1 | 12/2007 |
| WO | WO 2008/018528 A1 | 2/2008 |
| WO | WO 2008/026530 A1 | 3/2008 |

OTHER PUBLICATIONS

Japanese Patent Office, International Written Opinion in International Patent Application No. PCT/JP2008/067144 (Dec. 16, 2008).
Japanese Patent Office, Notice of Reasons for Rejection in Japanese Patent Application No. JP 2007-246701 (Apr. 13, 2010).
Euopean Patent Office, Extended European Search Report in European Patent Application No. 08833952.8 (Feb. 2, 2012).
European Patent Office, Supplementary European Search Report in European Patent Application No. 07745143 (Nov. 20, 2009).
International Bureau of WIPO, International Preliminary Report on Patentability in International Patent Application No. PCT/JP2007/061860 (Dec. 16, 2008).
Japanese Patent Office, International Search Report in International Patent Application No. PCT/JP2007/061860 (Sep. 4, 2007).
Korean Patent Office, Notice Requesting Submission of Opinion in Korean Application No. 10-2009-700609 (Jul. 8, 2010).
Mukoyama, Yokinobu, of Tsuruga Center, Toyobo Co., Ltd., "Experiment Report" (Jun. 30, 2010) [with respect to Office Action dated Apr. 8, 2010 in Japanese Patent Application No. 2007-215454].
European Patent Office, Extended European Search Report in European Patent Application No. 09714855 (Mar. 26, 2012).
European Patent Office, Extended European Search Report in European Patent Application No. 07793001 (Sep. 15, 2012).
Japanese Patent Office, International Search Report in International Patent Application No. PCT/JP2007/066524 (Oct. 9, 2007).
Japanese Patent Office, International Written Opinion in International Patent Application No. PCT/JP2007/066524 (Oct. 9, 2007).
Japanese Patent Office, International Search Report in International Patent Application No. PCT/JP2009/053234 (Jun. 2, 2009).
Japanese Patent Office, International Written Opinion in International Patent Application No. PCT/JP2009/053234 (Jun. 2, 2009).
Japanese Patent Office, Notice of Reasons for Rejection in Japanese Patent Application No. JP2007-215454 (Apr. 2, 2010).
Japanese Patent Office, Notice of Reasons for Rejection in Japanese Patent Application No. JP2007-215454 (Oct. 12, 2010).
Japanese Patent Office, Notice of Reasons for Rejection in Japanese Patent Application No. 2007-215454 (Jan. 25, 2011).
State Intellectual Property Office of People's Republic of China, First Office Action in Chinese Patent Application No. 200880107080.3 (Aug. 31, 2012).
European Patent Office, Communication Pursuant to Article 94(3) EPC in European Patent Application No. 08 833 952.8 (Jan. 29, 2013).
European Patent Office, Extended European Search Report in European Patent Application No. 13170654.1 (Jul. 22, 2013).
Taiwan Patent Office, Notification for the Opinion of Examination in Taiwan Application No. 096148849 (Apr. 8, 2013).

* cited by examiner

PROCESS FOR PRODUCTION OF HEAT-SHRINKABLE POLYESTER FILM, HEAT-SHRINKABLE POLYESTER FILM AND PACKAGES

TECHNICAL FIELD

The present invention relates to a process for production of a heat-shrinkable polyester film, a heat-shrinkable polyester film, and packages, specifically relates to a process for production of a heat-shrinkable polyester film, a heat-shrinkable polyester film, and packages using the label.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

Further, as a heat-shrinkable film, a film is generally utilized which greatly shrinks in the width direction in terms of handleability in label production. Hence, the conventional heat-shrinkable polyester film has been produced by drawing at a high ratio in the width direction in order to exhibit a sufficient shrinkage force in the width direction at heating.

However, regarding the conventional heat-shrinkable polyester film, since almost no drawing is carried out in the longitudinal direction orthogonal to the main shrinkage direction, the mechanical strength is low, in the case where it is shrunk and coated on a PET bottle or the like as a label, there is a defect that a label cannot be torn well along perforations (namely, poor perforation-tear property). There is a problem that a breaking resistance is insufficient after storage when a film is used as a label of beverage containers. Further, when a film is drawn in the longitudinal direction in production in order to improve perforation-tear property of the heat-shrinkable polyester film, the mechanical strength becomes high, and perforation-tear property are improved to some extent, however, shrinkage force is exhibited in the longitudinal direction, thus when it is shrunk and coated on a PET bottle or the like as a label, a defect in which visual quality (shrinkage finish properties) becomes very bad is exposed.

Therefore, in order to improve perforation-tear property of the heat-shrinkable polyester film, a method in which an incompatible thermoplastic resin is mixed in the main raw material of the heat-shrinkable polyester film is proposed (Patent document 1).

Patent document 1: Japanese Unexamined Patent Publication No. 2002-363312

DISCLOSURE OF THE INVENTION

Problem to be Solved by the Invention

According to the method in which an incompatible thermoplastic resin is mixed in the main raw material of the heat-shrinkable polyester film like the above-described Patent document 1, although the perforation-tear property of the heat-shrinkable polyester film are improved to some extent, it cannot be necessarily said to obtain a heat-shrinkable polyester film with sufficient perforation-tear property. There is a problem that a breaking resistance is insufficient after storage when a film is used as a label of beverage containers. Further, even in the case of adopting a method like the Patent document 1, since drawing can be carried out only in the width direction in production, it is not possible to produce a heat-shrinkable polyester film efficiently.

An object of the present invention is to solve the problems that the conventional heat-shrinkable polyester film has, and provide a heat-shrinkable polyester film with very good perforation-tear property, good breaking resistance after storage when a film is used as a label of beverage containers and also very high productivity.

The present inventors keenly studied to solve the above-described problems and as a result, they completed the present invention at last. That is, the present invention is configured as follows.

Means for Solving the Problem

1. A process for producing a heat-shrinkable polyester film wherein the heat-shrinkable polyester film comprising a polyester resin with ethylene terephthalate as the main constituent and containing at least 13 mol % of at least one monomer component capable of forming an amorphous component in the whole polyester resin component is continuously produced, the heat-shrinkable polyester film satisfying the following requirements (1) to (4):

(1) the hot-water shrinkage in the longitudinal direction is not less than −2% and not more than 4% when the heat-shrinkable polyester film is treated in hot water of 80° C. for 10 seconds;

(2) the hot-water shrinkage in the width direction is not less than 50% and not more than 80% when the heat-shrinkable polyester film is treated in hot water of 95° C. for 10 seconds;

(3) the number of initial breakages, which is the number of breakages before 5% extension, is not more than 7 when the heat-shrinkable polyester film is repeatedly subjected to a tensile test 10 times in the longitudinal direction using a tensile tester with a distance between chucks of 100 mm after being aged in an atmosphere of 85% RH at 30° C. for 672 hours; and (4) the perpendicular tear strength to the longitudinal direction per unit thickness is not less than 300 N/mm and not more than 410 N/mm after the heat-shrinkable polyester film is shrunk by 10% in the width direction in hot water of 80° C.;

and the process comprising the following steps (a) to (e):

(a) a lengthwise drawing step of drawing an undrawn film at a temperature of not less than 75° C. and not more than 100° C. by not less than 1.1 times and not more 1.8 times in the longitudinal direction;

(b) an intermediate heat treatment step of heat-treating the film after the lengthwise drawing at a temperature of not less than 110° C. and not more than 150° C. for not less than 5 seconds and not more than 30 seconds in a state of holding both ends in the width direction by clips in a tenter;

(c) a forced cooling step of positively cooling the film after the intermediate heat treatment till the surface temperature becomes a temperature of not less than 70° C. and not more than 90° C.;

(d) a transverse drawing step of drawing the film after the forced cooling at a temperature of not less than 65° C. and not more than 90° C. by not less than 3.5 times and not more than 5.0 times in the width direction; and (e) a final heat treatment step of heat-treating the film after the transverse drawing at a temperature of not less than 80° C. and not more than 100° C. for not less than 5 seconds and not more than 30 seconds in a state of holding both ends in the width direction by clips in a tenter.

2. A heat-shrinkable polyester film made of a polyester resin comprising ethylene terephthalate as a main constituent and containing at least 13 mol% of at least one monomer capable of forming an amorphous component in the whole components of the polyester resin, satisfying the following requirements (1) to (4):

(1) the hot-water shrinkage in the longitudinal direction is not less than −2% and not more than 4% when the heat-shrinkable polyester film is treated in hot water of 80° C. for 10seconds;

(2) the hot-water shrinkage in the width direction is not less than 50% and not more than 80% when the heat-shrinkable polyester film is treated in hot water of 95° C. for 10seconds;

(3) the number of initial breakages, which is the number of breakages before 5% extension, is not more than 7 when the heat-shrinkable polyester film is repeatedly subjected to a tensile test 10 times in the longitudinal direction using a tensile tester with a distance between chucks of 100 mm after being aged in an atmosphere of 85%RH at 30° C. for 672hours; and (4) the perpendicular tear strength to the longitudinal direction per unit thickness is not less than 300 N/mm and not more than 410 N/mm after the heat-shrinkable polyester film is shrunk by 10% in the width direction in hot water of 80° C.

3. The heat-shrinkable polyester film described in the second, wherein solvent adhesive strength is 2 N/15 mm width or more and 10 N/15 mm width or less.

4. The heat-shrinkable polyester film described in the second or third, wherein irregularity of thickness in the longitudinal direction is 1% or more and 18% or less.

5. The heat-shrinkable polyester film described in any one of the second to fourth, wherein irregularity of thickness in the width direction is 1% or more and 18% or less.

6. The heat-shrinkable polyester film described in any one of the second to fifth, wherein the thickness is 20 μm or more and 80 μm or less.

7. The heat-shrinkable polyester film described in any one of the second to sixth, wherein the haze is 3 or more and 13 or less.

8. The heat-shrinkable polyester film described in any one of the second to seventh, wherein a major component of the at least one monomer capable of forming the amorphous component in the whole components of the polyester resin component is any one of neopentyl glycol, 1,4-cyclohexanedimethanol and isophthalic acid.

9. A package, wherein the heat-shrinkable polyester film described in any one of the second to eighth is used as a base material, and a label provided with perforations or a pair of notch is coated on at least a part of the outer circumference and heat-shrunk.

10. A process for continuously producing of the heat-shrinkable polyester film described in any one of Claims third to ninth, comprising the following steps (a) to (e):

(a) a lengthwise drawing step of drawing an undrawn film at a temperature of not less than 75° C. and not more than 100° C. by not less than 1.1 times and not more 1.8 times in the longitudinal direction;

(b) an intermediate heat treatment step of heat-treating the film after the lengthwise drawing at a temperature of not less than 110° C. and not more than 150° C. for not less than 5 seconds and not more than 30 seconds in a state of holding both ends in the width direction by clips in a tenter;

(c) a forced cooling step of positively cooling the film after the intermediate heat treatment till the surface temperature becomes a temperature of not less than 70° C. and not more than 90° C.;

(d) a transverse drawing step of drawing the film after the forced cooling at a temperature of not less than 65° C. and not more than 90° C. by not less than 3.5 times and not more than 5.0 times in the width direction; and (e) a final heat treatment step of heat-treating the film after the transverse drawing at a temperature of not less than 80° C. and not more than 100° C. for not less than 5 seconds and not more than 30 seconds in a state of holding both ends in the width direction by clips in a tenter.

Effects of the Invention

The heat-shrinkable polyester film of the present invention has high shrinkability in the width direction being the main shrinkage direction, and high mechanical strength in the longitudinal direction orthogonal to the width direction, and also perforation-tear property as a label are good, so that it is possible to cut it cleanly along perforations from the start of tear in tearing until the completion of tear. Further, stiffness (so-called "bend" strength) is high, and attachability as a label is excellent. In addition, processabilities in printing and tubing are excellent. Therefore, the heat-shrinkable polyester film of the present invention can be suitably used as labels for containers such as bottles, and when used as labels, it can be attached very efficiently on containers such as bottles within a short time, and when heat-shrunk after attachment, it can exhibit good finish property almost free from wrinkle or lack of shrinkage, and the label attached exhibits very good perforation-tear property. The package of the present invention shows a good tear property of a coated label, so that it is possible to tear the coated label cleanly along perforations by a suitable force.

The heat-shrinkable polyester film of the present invention is very high in adhesion force when front and back surfaces (or the same surfaces of the front and back surfaces) are bonded with a solvent. Therefore, it can be suitably used as various kinds of wrapping labels such as labels for plastic bottles, and the like.

BEST MODE FOR CARRYING OUT THE INVENTION

The polyester used in the present invention is a polyester whose main constituent is ethylene terephthalate. Namely, it contains 50% by mole or more, preferably 60% by mole or more of ethylene terephthalate. Dicarboxylic acid components constituente the polyester of the present invention can include aromatic dicarboxylic acids such as isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage ratio.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat-shrinkable polyester film of the present invention is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C.

Further, the polyester used for the heat-shrinkable polyester film of the present invention preferably has 13% by mole or more of the sum of at least one monomer capable of forming an amorphous component in 100% by mole of the polyhydric alcohol component or in 100% by mole of the polybasic carboxylic acid component in the whole polyester resin, more preferably 15% by mole or more, further more preferably 17% by mole or more, and particularly preferably 20% by mole or more. Here, as a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used. However when the amount of the monomer of forming an amorphous component is too much, heat-shrink property may become great more than necessary, and mechanical property may become insufficient. Therefore the film preferably has 40% by mole or less of the sum of the monomer capable of forming an amorphous component, more preferably 30% by mole or less.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage ratio.

Further, in the polyester used in the heat-shrinkable polyester film of the present invention, it is preferable not to contain diethylene glycol, triethylene glycol and polyethylene glycol as far as possible.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber. By adding fine particles as lubricant to a resin for forming the heat-shrinkable polyester film of the present invention, it is preferable to make workability (slipperiness) of the polyethyleneterephthalate-based resin film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

Furthermore, it is also possible to conduct corona treatment, coating treatment, frame treatment etc. on the heat-shrinkable polyester film of the present invention in order to enhance adhesiveness of film surface.

In the heat-shrinkable polyester film of the present invention, when it is treated for 10 seconds under no-load condition in hot water at 80° C., heat shrinkage in the longitudinal direction of the film calculated from the following Equation 1 (namely, hot-water heat shrinkage at 80° C.) is preferable −2% or more and 4% or less from the lengths before and after shrinkage.

$$\text{Heat shrinkage} = \{(\text{length before shrinkage} - \text{length after shrinkage})/\text{length before shrinkage}\} \times 100(\%) \qquad \text{Equation 1}$$

When the hot-water heat shrinkage in the longitudinal direction at 80° C. is less than −2% (namely, the film stretches higher than 2% of shrinkage ratio by heat treatment), it is not preferable because a good shrinkage appearance cannot be obtained when used as a label of a bottle, conversely, when the hot-water heat shrinkage in the longitudinal direction at 80° C. is more than 4%, it is not preferable because strain in shrinkage at heat shrinkage tends to occur when used as a label. Additionally, the hot-water heat shrinkage in the longitudinal direction at 80° C. is preferably −2% or more and 4% or less, more preferably −1% or more and 3% or less, and particularly preferably 0% or more and 2% or less. Here, in regard to a reason for adopting a measuring temperature of 80° C., it is a temperature comparable to the actual temperature of a label in passing the label through a shrink-tunnel by steam, for example, during a step of mounting the label on a container, and the temperature of 80° C. is adopted in order to ensure that the defect hardly occurs in the label mounting step.

Further, in the heat-shrinkable polyester film of the present invention, when it is treated for 10 seconds under no-load condition in hot water at 95° C., from the lengths before and after shrinkage, heat shrinkage in the width direction of the film calculated from the foregoing Equation 1 (namely, hot-water heat shrinkage at 95° C.) is preferable 50% or more and 80% or less.

When the hot-water heat shrinkage in the width direction at 95° C. is less than 50%, since the amount of shrinkage is small, it is not preferable because wrinkle and sag generate on a label after heat shrinkage. Conversely, when the hot-water heat shrinkage in the width direction at 95° C. is more than 80%, strain in shrinkage at heat shrinkage tends to occur when used as a label, or so-called "jumping up" may be generated, and therefore the case is not preferred. Additionally, the hot-water heat shrinkage in the width direction at 95°

C. is preferably 50% or more and 80% or less, more preferably 52% or more and 78% or less, and particularly preferably 55% or more and 75% or less. Here, in regard to a reason for adopting a measuring temperature of 95° C., the shrinkage potential in the width direction, which is the main shrinkage direction and where the largest shrinkage is achieved by the film, is a great concern to customers, and the temperature of 95° C., which is a temperature close to the temperature of boiling water, is adopted in order to express the shrinkage potential in the width direction.

In the heat-shrinkable polyester film of the present invention, the number of initial breakages in the film longitudinal direction is preferably not more than 7 after the heat-shrinkable polyester film is stored under the atmosphere of 30° C. and a relative humidity of 85% for 672 hours (four weeks). The number of initial breakages is as follows: when, for a plurality of film test pieces after being stored under the above-described conditions, is subjected to a tensile test in the direction perpendicular to the main shrinkage direction under the conditions of a test piece length of 140 mm, a distance between chucks of 100 mm, a test piece width of 15 mm, a temperature of 23° C. and a tensile speed of 200 mm/min, the number of tests in which a breakage occurs at a breaking elongation of 5% or less out of 10 times of tensile tests repeated. When the number of initial breakages is more than 7, in the case that a film is processed after storage for a long time, there arise troubles and defects such as a breakage due to deterioration of breaking resistance of the film. The number of initial breakages is more preferably not more than 6, and further preferably not more than 5. Obviously, the smaller the number of initial breakages is, the more preferable it is, and the number of not more than 1 is particularly preferable and zero is most preferable.

In the heat-shrinkable polyester film of the present invention, when right-angled tearing strength per unit thickness in the longitudinal direction after being shrunk by 10% in the width direction in hot water at 80° C., the right-angled tearing strength per unit thickness in the longitudinal direction is preferable 300 N/mm or more and 410 N/mm or less.

[Measuring Method of Right-Angled Tearing Strength]

After the film is shrunk by 10% in the width direction in hot water adjusted at 80° C., it is sampled as a specimen with a predetermined size in accordance with JIS-K-7128. Thereafter, both edges of the specimen are held by a universal tensile tester and strength at tensile break in the longitudinal direction of film is measured in a condition of 200 mm/min in tensile speed. Then, right-angled tearing strength per unit thickness is calculated using the following Equation 2.

Right-angled tearing strength=strength at tensile break/thickness  Equation 2

When the right-angled tearing strength after being shrunk by 10% in the width direction in hot water at 80° C. is less than 300 N/mm, a situation in which the film is easily torn by an impact such as falling during transportation is possibly caused when the film is used as a label, whereby the case is unpreferred, conversely, when the right-angled tearing strength is more than 410 N/mm, it is not preferable because cutting property (easiness of tearing) become bad at an early stage of tearing a label. The lower limit value of the right-angled tearing strength is preferably 310 N/mm or more. Further, the upper limit value of the right-angled tearing strength is preferably 400 N/mm or less, more preferably 390 N/mm or less. The right-angled tearing strength can be adjusted to be further lower by producing voids in the film by increasing the amount of additives in a resin.

Furthermore, the heat-shrinkable polyester film of the present invention preferably has solvent adhesive strength of 2 (N/15 mm) or more. When the solvent adhesive strength is less than 2 (N/15 mm), it is not preferable because it tends to peel from a solvent-bonded part after heat shrinkage of the label. The solvent adhesive strength is more preferably 3 (N/15 mm) or more, and particularly preferably 4 (N/15 mm) or more. Additionally, the higher the solvent adhesive strength, the better, but it is considered that the upper limit of the solvent adhesive strength is about 10 (N/15 mm) from performance of a film forming equipment. When the solvent adhesion strength is too high, in bonding two films with a solvent to form a label, a situation that the film is bonded to an unnecessary film tends to occur, and the productivity of the label is sometimes lowered. Thus, the solvent adhesion strength may be not more than 8.5 (N/15 mm), or not more than 7 (N/15 mm) in view of practical use.

Further, regarding the heat-shrinkable polyester film of the present invention, when 1,3-dioxolane is added dropwise on predetermined pieces of films piled, thereafter, predetermined pieces of films are piled on the part where 1,3-dioxolane is added dropwise, and an adhesion strength between the film on which 1,3-dioxolane is added dropwise and the film located thereunder, and an adhesion strength between the film piled on the film on which 1,3-dioxolane is added dropwise and the film located thereunder are measured after compressing a laminate of these films with a predetermined pressure for a predetermined time, it is preferable that these two adhesion strengths (namely, the solvent-penetration resistance index) are each not more than 0.2 N/15 mm (the detailed measuring method will be described later). When the solvent-penetration resistance index is more than 0.2 N/15 mm, in bonding two films with a solvent to form a label, a situation that the film is bonded to an unnecessary film tends to occur, and this is not preferable because production efficiency of the label is sometimes lowered. Additionally, the lower the solvent-penetration resistance index is, more preferable it is, and it is most preferable to be 0 (N/15 mm) that is not numerically detected by a tensile tester.

For the solvent-penetration resistance index to be not more than 0.2 N/15 mm, an amorphous ratio of the polyester polymer composing the film may be increased although there is an influence by other conditions to some extent. In the case of a single layer film, an amorphous raw material ratio is preferably not more than 80 mass %, and more preferably not more than 74 mass % in the examples to be described later. However, since the heat shrinkage properties become insufficient when the amorphous raw material ratio is too small, it is preferably not less than 20 mass %. In general, the total amount of at least one monomer component capable of forming an amorphous component in 100 mol % of a polyvalent alcohol component in the whole polyester resin composing a film is preferably not more than 40 mol %, and more preferably not more than 30 mol %. However, when the amount is too small, there is a case that the heat shrinkage properties become poor, thus it is preferably not less than 13 mol %.

In the present invention, as will be described later, in order to improve tearability in tearing and opening the film along perforations, it is preferable that a high IV polyester resin X and a low IV polyester resin Y form an X layer and a Y layer, respectively, which are laminated in an X/Y/X structure. In this case, making the amorphous ratio of the Y layer to the X layer large is preferable from the viewpoint of satisfying both the solvent adhesion strength and solvent penetration resistance. When the preferable amorphous ratio of the Y layer is written in mol % in the same manner as above, it is not more than 30 mol %, and further preferably not more than 20 mol %. However, when the amorphous ratio is too small, there is a case that the heat shrinkage properties become poor depending on the amorphous ratio of the X layer, thus it is preferably not less than 5 mol %, and further preferably not less than 8 mol %.

In the heat-shrinkable polyester film of the present invention, it is preferable that irregularity of thickness in the longitudinal direction (irregularity of thickness when measuring length is 10 m) is 18% or less. When the irregularity of thickness in the longitudinal direction is more than 18%, it is not preferable because irregularity of printing tends to occur in printing in a label production and irregularity of shrinkage tends to occur after heat shrinkage. The irregularity of thickness in the longitudinal direction is more preferably 16% or less and particularly preferably 14% or less. The smaller the irregularity of thickness in the longitudinal direction, the better, but it is considered that the lower limit of the irregularity of thickness is about 5% from performance of film forming equipment. The irregularity of thickness in the longitudinal direction is most preferably about 0%, but it is considered that the lower limit of the irregularity of thickness is 1% from performance of a film forming equipment.

In the heat-shrinkable polyester film of the present invention, it is preferable that irregularity of thickness in the width direction (irregularity of thickness when measuring length is 1 m) is 18% or less. When the irregularity of thickness in the width direction is more than 18%, it is not preferable because irregularity of printing tends to occur in printing in a label production and irregularity of shrinkage tends to occur after heat shrinkage. The irregularity of thickness in the width direction is more preferably 16% or less and particularly preferably 14% or less. The smaller the irregularity of thickness in the width direction, the better, but it is considered that the lower limit of the irregularity of thickness is about 4% from performance of film forming equipment. The irregularity of thickness in the longitudinal direction is most preferably about 0%, but it is considered that the lower limit of the irregularity of thickness is 1% from performance of a film forming equipment.

The thickness of the heat-shrinkable polyester film of the present invention is not particularly limited, but 20 μm or more and 80 μm or less is preferable as a heat-shrinkable film for a label, and 30 μm or more and 70 or less is more preferable. In addition, when the heat-shrinkable polyester film of the present invention has a laminate structure, the thickness of each layer is not particularly limited, but preferably 5 μm or more respectively.

The heat-shrinkable polyester film of the present invention preferably has a haze value of 3 or more and 13 or less. When the haze value exceeds 13, it is not preferable because transparency becomes bad, so that there is a probability that appearance becomes bad in a label production. Additionally, the haze value is more preferably 12 or less, and particularly preferably 11 or less. Further, the smaller the haze value, the better, but the lower limit is about 3 from considerations that a predetermined amount of a lubricant may be added to the film in order to provide slipperiness necessary for practical use or the like.

In the heat-shrinkable polyester film of the present invention, it is preferable that a high IV polyester resin X and a low IV polyester resin Y being different in intrinsic viscosity (IV) from each other form an X layer and a Y layer, respectively, which are laminated in an X/Y/X structure (however, a single layer film is not intended to be excluded). In order to improve tearability in tearing and opening a heat-shrinkable polyester film made of polyethylene terephthalate as a main raw material along perforations in the case that the film is made into a label, the present inventors made investigations and as a result, they found that in producing a heat-shrinkable film from a polyester resin, the above-described tearability can be improved by adding a large amount of a polyester raw material of a low intrinsic viscosity (IV). However, it was found that when a large amount of a low IV polyester raw material is added, unfavorable phenomena such as deterioration of solvent adhesiveness and shrinkage appearance and increase in initial breakage rate occur.

Based on the knowledge on the heat-shrinkable film obtained by adding a low IV polyester raw material as described above, the present inventors studied whether it is possible to obtain a heat-shrinkable film excellent in all of tearability, solvent adhesiveness and shrinkage appearance or not by adjusting the kind and amount of the amorphous components added to a low IV polyester raw material. However, it was somewhat difficult to provide a single layer heat-shrinkable film with good tearability, good solvent adhesiveness, good shrinkage appearance and a small number of initial breakages in a well-balanced manner. Hence, the applicants considered the following possibility and keenly studied: other than a single layer heat-shrinkable film, a laminate film obtained by laminating a layer made of a low IV polyester raw material (hereinafter, simply called a low IV layer) and a layer made of a high IV polyester raw material (hereinafter, simply called a high IV layer) may be able to improve the solvent adhesiveness, shrinkage appearance and initial breakage rate of a heat-shrinkable film containing a low IV polyester raw material.

In an early stage of the study, there was a fear that the heat shrinkage properties in the width direction might not be sufficiently obtained when a low IV layer and a high IV layer are laminated. However, as a result of investigating the relationship between the lamination method and lamination mode of the low IV layer and the high IV layer, and the tearability, solvent adhesiveness, shrinkage appearance and initial breakage property of the laminate film in detail, in contradiction to the original expectation, it was made clear that when a low IV layer and a high IV layer are laminated, a good additive property of the shrinkage properties holds. It was found that, by laminating a low IV layer and a high IV layer by a specific method (coextrusion) shown below, it becomes possible that the properties of the low IV layer is compensated by the high IV layer, and along with good tearability, contradictory properties such as good solvent adhesiveness, shrinkage appearance and a small number of initial breakages are satisfied at the same time. In addition thereto, it was also found that by laminating a layer made of a low IV polyester raw material and a layer made of a high IV polyester raw material by the specific method as described above, the solvent penetration property and adhesion strength after a short time are remarkably improved.

In the present invention, the intrinsic viscosity (IV) of the film is preferably 0.62 dl/g or more. When the intrinsic viscosity (IV) of the film is 0.62 dl/g, it is possible to ensure breaking resistance of the film, and to decrease generation of troubles and defects such as breakages in the printing process and solvent adhesion process. In production of the heat-shrinkable polyester film of the present invention, a recycled raw material (a recycled raw material such as a PET bottle) can be mixed in an ordinary polyester raw material. There is a case that the intrinsic viscosity (IV) of the recycled raw material is less than 0.62, and for the intrinsic viscosity of the film to be 0.62 dl/g or more, it is preferable to control the intrinsic viscosity of other polyester raw materials except the recycled raw material at a higher value than usual. Specifically, in consideration of lowering of the intrinsic viscosity by melt extrusion, the intrinsic viscosity of other polyester raw materials is preferably set to be not less than 0.68 dl/g, more preferably not less than 0.70 dl/g, and further preferably not less than 0.72 dl/g. Additionally, the lower limit of the intrinsic viscosity as a film is preferably 0.63 dl/g, and further preferably 0.64 dl/g.

As describe above, in the heat-shrinkable polyester film of the present invention, it is preferable that a high IV polyester resin X and a low IV polyester resin Y being different in intrinsic viscosity (IV) from each other form an X layer and a Y layer, respectively, which are laminated in an X/Y/X structure (however, a single layer film is not intended to be excluded), and it is preferable that the intrinsic viscosities IV of the X layer and the Y layer are different by at least 0.01 dl/g. When the difference is less than 0.01 dl/g, the film is almost the same as a single layer film. However, when the IV difference is too large, unfavorable points such as insufficient mechanical properties appear, thus the IV difference between the X layer and the Y layer is sufficient to be 0.08 dl/g or less.

The production method of the heat heat-shrinkable polyester film of the present invention is not particularly limited, and is described by examples. The heat heat-shrinkable polyester film of the present invention can be obtained from a polyester raw material that has ethylene terephthalate as main constituent and has 13% by mole or more of the sum of at least one monomer capable of forming an amorphous component in the whole polyester resin, and the polyester raw material is melt-extruded by an extruder to form an undrawn film, and the undrawn film is biaxially drawn by a predetermined method shown below and heat-treated.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

In the case that a laminate film with a multilayer construction is adopted as the heat-shrinkable polyester film of the present invention, a method of coextruding molten resin raw materials by a plurality of extruders (so-called coextrusion) can be preferably used. In addition, in the case of using a recycled raw material in production of the heat-shrinkable polyester film of the present invention, it is necessary to suitably adjust the amounts of the recycled raw material and the other polyester raw materials in the resin raw material composing each layer. Additionally, as a recycled raw material such as a PET bottle recycled raw material, it is preferable to use one in the form of a chip washed and crushed by a known method. It is preferable to choose a polyester raw material in order to make the IV of the core layer to be low and the IV of the skin layer to be high in a laminated structure. In general, it can be said that a mixture incorporating a large amount of a polyester raw material of a high IV has a high IV.

The undrawn film obtained is drawn in the longitudinal direction under a predetermined condition as described below, and the film after longitudinally drawing is quenched, and then heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming method to obtain a heat-shrinkable polyester film of the present invention is described in detail by considering the difference from the film forming method of the conventional heat-shrinkable polyester film.

As described above, a conventional heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable polyester film with good perforation-tear property and high productivity, and as a result, they consider the following surmise at the present time.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

Then, the present inventors have reached a conclusion that in order to satisfy good perforation-tear property and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable polyester film satisfying good perforation-tear property and finish properties after shrinkage at the same time.

(1) Control of lengthwise drawing condition
(2) Intermediate heat treatment after lengthwise drawing
(3) Forced cooling after intermediate heat treatment
(4) Control of transverse drawing condition Hereinafter, each means described above is described sequentially.

(1) Control of Lengthwise Drawing Conditions

In the production of a film by the lengthwise-transverse drawing method of the present invention, in order to obtain a film roll of the present invention, it is preferable to conduct the lengthwise drawing at a relatively low ratio of not less than 1.1 times and not more than 1.8 times in a substantially single lengthwise drawing step at a temperature of not less than 75° C. and not more than 100° C.

By the lengthwise drawing at a low ratio as described above, it becomes possible to control the degree of orientation and the tension of molecules in the longitudinal and width directions of the film in the intermediate heat-setting, transverse drawing and final heat treatment to be described later, and consequently to make perforation opening property of the final film better. When the drawing ratio in the lengthwise drawing is less than 1.1 times, the merits of conducting the lengthwise drawing is substantially not obtained and the perpendicular tear strength in the longitudinal direction becomes large, which is not preferable because perforation opening property sometimes deteriorates when the film is used as a label. There is also a tendency that the number of initial breakages increases and furthermore, it is difficult to increase the line speed of the film-making equipment. When the drawing ratio of the lengthwise drawing exceeds 1.8 times, although favorable data are obtained as to the perpendicular tear strength and the number of initial breakages, the shrinkage rate in the longitudinal direction tends to become large, which is not preferable.

The irregularity of thickness in the lengthwise direction increases as the drawing ratio in the lengthwise direction increases. According to the studies by the present inventors, the irregularity of thickness becomes maximum at about 2.5 times and thereafter tends to decrease. That is, by setting the drawing ratio of the lengthwise drawing at a relatively low ratio of 1.1 to 1.8 times, an effect of decreasing the irregularity of thickness in the lengthwise direction can be obtained.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat setting, transverse drawing is conducted in a predetermined condition, thereby without causing breakage in the transverse drawing, to be able to make "molecules not contributed to shrinkage force while being oriented in the longitudinal direction" present in the film.

Namely, in the production of the film of the present invention by a lengthwise-transverse drawing method, after an undrawn film is lengthwisely drawn, under a state that both edges in the width direction are held by clips in a tenter, it is preferably to conduct heat treatment (hereinafter called intermediate heat treatment) at a temperature of 110° C. or more and 150° C. or less for 5 second or more and 30 seconds or less. By conducting such intermediate heat treatment, it becomes possible that "molecules not contributed to shrinkage force while being oriented in the longitudinal direction" can be present in a film, from which it becomes possible to obtain a film in which perforation opening property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following forced cooling and transverse drawing, it becomes possible to orient molecules to the width direction and exhibit shrinkage force in the width direction while maintaining "molecules not contributed to shrinkage force while being oriented in the longitudinal direction."

The temperature of the intermediate heat treatment is preferably not less than 110° C. and not more than 150° C. When the lower limit of the temperature of the intermediate heat treatment is less than 110° C., it is not preferable because the shrinkage force in the longitudinal direction remains, and the shrinkage rate in the longitudinal direction of the film after being drawn in the transverse direction becomes high. When the upper limit of the temperature of the intermediate heat treatment is more than 150° C., it is not preferable because the surface layer of the film is roughened and transparency becomes high. Thus, the preferable temperature of the intermediate heat treatment is not less than 110° C. and not more than 150° C., more preferably not less than 115° C. and not more than 145° C., and further preferably not less than 120° C. and not more than 140° C. It is preferable to consider the temperature of the intermediate heat treatment to some extent depending on the composition of raw materials and the drawing ratio in the lengthwise direction.

The time of the intermediate heat treatment is preferably not less than 5 seconds and not more than 30 seconds. Although the intermediate heat treatment can be performed at a lower temperature in the case of performing the treatment for a time longer than 30 seconds, the productivity is lowered. When the treatment time is less than 5 seconds, it is not preferable because the shrinkage force in the longitudinal direction of the film remains, and the shrinkage rate in the longitudinal direction of the film after being drawn in the transverse direction becomes high. Thus, the time of the intermediate heat treatment is preferably not less than 5 seconds and not more than 30 seconds, more preferably not less than 7 seconds and not more than 28 seconds, and further preferably not less than 9 seconds and not more than 26 seconds. It is preferable to consider the temperature of the intermediate heat treatment to some extent depending on the composition of raw materials and the drawing ratio in the lengthwise direction.

Further, in conducting the intermediate heat treatment as described above, it is preferable to adjust conditions of intermediate heat treatment such that a refractive index in the longitudinal direction of the film after intermediate heat treatment is in a range of 1.56 to 1.595, and heat shrinkage stress in the longitudinal direction of the film after intermediate heat treatment is 0.5 MPa or less. By conducting the intermediate heat treatment in such a predetermined condition, it becomes possible to control degree of orientation in the longitudinal and width directions of the film and degree of tension of molecule in transverse drawing and final heat treatment, from which perforation opening property of the final film can be made good. When refractive index in the longitudinal direction of the film after intermediate heat treatment is less than 1.56, even by adjusting conditions of transverse drawing and final heat treatment, it becomes difficult to obtain a film with good perforation opening property, which is not preferable. When refractive index in the longitudinal direction of the film after intermediate heat treatment is more than 1.595, even by adjusting conditions of transverse drawing and final heat treatment, it becomes difficult to obtain a film with good perforation opening property, which is not preferable.

(3) Forced Cooling of the Film after Intermediate Heat Treatment

In production of a film by the lengthwise-transverse drawing method of the present invention, as described above, the film after intermediate heat treatment is not transversely drawn as it is, but it is preferable that a temperature of the film is quenched to be 70° C. or more and 90° C. or less. By conducting such quenching treatment, it becomes possible to obtain a film with good perforation opening property as a label. The lower limit of the temperature of the film after quenching is preferably 72° C. or more, and more preferably 74° C. or more. Further, the upper limit of the temperature of the film after quenching is preferably 85° C. or less, and more preferably 80° C. or less.

As described above, in quenching a film, when the temperature of the film after quenching keeps exceeding 90° C., shrinkage ratio in the width direction of the film becomes low and shrinkage becomes insufficient as a label, but by controlling the temperature of the film after quenching at 90° C. or less, it becomes possible to maintain shrinkage ratio in the width direction of the film high.

Further, in quenching a film, when the temperature of the film after keeps continues exceeding 90° C., stress of transverse drawing carried out after cooling becomes small, and the irregularity of thickness in the width direction tends to become large, but by quenching a temperature of the film after cooling to be 90° C. or less, it becomes possible to increase the stress of transverse drawing carried out after cooling and to reduce the irregularity of thickness in the width direction.

In addition, in quenching a film, when the temperature of the film after quenching keeps continues less than 70° C., stress of drawing becomes large, breakage of the film tends to occur. Therefore temperature of the film after cooling is preferably not less than 70° C. and not more than 90° C. or less, and more preferably not less than 72° C. and not more than 85° C., and further preferably not less than 74° C. and not more than 80° C.

(5) Control of Transverse Drawing Condition

In production of a film by the lengthwise-transverse drawing method of the present invention, it is preferable to transversely drawing a film in a predetermined condition after lengthwise drawing, intermediate heat treatment and quenching. Namely, the transverse drawing is preferably carried out such that the ratio becomes 3.5 times or more and 5.0 times or less at 65° C. or more and 90° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment, from which it becomes possible to obtain a film in which perforation opening property are good as a label. The lower limit of the temperature of transverse drawing is preferably 67° C. or more, and more preferably 70° C. or more. The upper limit of the temperature of transverse drawing is preferably 85° C. or less, and more preferably 80° C. or less. On the other hand, the lower limit of transverse drawing ratio is preferably 3.6 times or more, and more preferably 3.7 times or more. Further, the upper limit of transverse drawing ratio is preferably 4.9 times or less, and more preferably 4.8 times or less.

Further, when drawing temperature exceeds 90° C., shrinkage ratio in the longitudinal direction and also shrinkage ratio in the width direction become low, but by controlling the drawing temperature at 90° C. or less, it becomes possible to suppress the shrinkage ratio in the longitudinal direction low and maintain the shrinkage ratio in the width direction high.

Furthermore, when drawing temperature in the transverse direction becomes high at about 90° C., orientation in the transverse direction becomes low, solvent adhesive strength becomes high and also it becomes possible to prevent pressure-crash of lubricant and keep a friction coefficient low. In addition, when drawing temperature in the transverse direction becomes high at about 90° C., haze of the film becomes low due to decrease of voids inside the film.

Further, when drawing temperature exceeds 90° C., there is a tendency that the irregularity of thickness in the width direction becomes large, but by controlling the drawing temperature at 90° C. or less, it becomes possible to reduce the irregularity of thickness in the width direction.

On the other hand, when drawing temperature is less than 65° C., orientation in the width direction becomes too high, breakage tends to occur in transverse drawing, but by controlling the drawing temperature at 65° C. or more, it becomes possible to reduce the breakage in transverse drawing.

[Influence of Interaction in Production Process on Film Properties]

In production of a heat-shrinkable polyester film of the present invention, it is considered that by conducting all of the lengthwise drawing step, the intermediate heat treatment step, the forced cooling step and the transverse drawing step in predetermined conditions, it becomes possible to make film properties very efficiently good. Further, among the film properties, the important properties such as right-angled tearing strength in the longitudinal direction, irregularity of thickness in the width direction, irregularity of thickness in the longitudinal direction, tensile breaking strength may greatly vary in the values depending on interactions of a plurality of specific steps each other.

Namely, in the heat-shrinkable polyester film of the present invention, right-angled tearing strength in the longitudinal direction is preferably adjusted to 300 N/mm or more and 410 N/mm or less, and more preferably to 400 N/mm or less, and further preferably to 390 N/mm or less. Controlling conditions in lengthwise drawing step and intermediate heat treatment step is very important to the right-angled tearing strength in the longitudinal direction.

Regarding the heat-shrinkable polyester film of the present invention, the number of initial breakages is preferably adjusted to 7 or less. As a large factor, it can be said that the intrinsic viscosity (IV) of the polymer composing the film is preferably large, and other than that, there is a remarkable tendency that the drawing ratio in the lengthwise drawing step is preferably increased as high as possible up to 1.8 times.

Furthermore, in the heat-shrinkable polyester film of the present invention, irregularity of thickness in the width direction is preferably adjusted to 1% or more and 18% or less, and controlling conditions in lengthwise drawing step, intermediate heat treatment step and transverse drawing step is very important to the irregularity of thickness in the width direction.

Furthermore, in the heat-shrinkable polyester film of the present invention, irregularity of thickness in the longitudinal direction is preferably adjusted to 1% or more and 18% or less, and controlling conditions in lengthwise drawing step and intermediate heat treatment step is very important to the irregularity of thickness in the width direction.

Regarding the heat-shrinkable polyester film of the present invention, it is preferable to adjust the solvent adhesion strength to not less than 2 N/15 mm and not more than 10 N/15 mm. A large factor of the solvent adhesion strength is the amorphous raw material ratio of the film surface. When the amorphous raw material ratio is large, the solvent adhesion strength tends to be large. For example, in the following examples, the amorphous raw material ratio of the film surface of 40 mass % or more is preferable because it becomes easy to set the solvent adhesion strength to be not less than 2 N/15 mm. However, when the amorphous raw material ratio is too large, there is a case that the heat shrinkage properties becomes too large, thus it is preferably not more than 95 mass %. In general, the amount of the amorphous monomer in terms of mol percentage, which expresses the total content of at least one monomer component capable of forming an amorphous component in 100 mol % of a polyvalent alcohol component in a polyester resin of the film surface, is preferably not less than 10 mol % because it becomes easy to set the solvent adhesion strength to be not less than 2 N/15 mm. The amount of the amorphous monomer is further preferably not less than 13 mol % of the film surface and even more preferably not less than 20 mol % of the film surface. However, when it is too large, there is a case that the heat shrinkage properties becomes too large, thus it may be not more than 50 mol %, preferably not more than 40 mol %, and further preferably not more than 30 mol %. In the case that a film is composed of a lamination structure of polyester resins having an IV difference in a plurality of layers, the amorphous ratio of the surface layer (X layer) is important, and the above-described preferable range for the film surface is also applicable to the X layer. The solvent adhesion strength is also related to other production conditions of the film and to the intermediate heat-setting step and the forced cooling step conditions. The total drawing ratio in the lengthwise and transverse directions (area ratio) is also related to the solvent adhesion strength, and it can be usually said that the smaller the total drawing ratio is, the higher the solvent adhesion strength is.

Regarding the heat-shrinkable polyester film of the present invention, it is preferable to adjust haze to not less than 3 and to not more than 13, haze is related to the amorphous ratio in the polymer and the kind and amount of an additive, and is also related to the conditions of lengthwise drawing step, intermediate heat treatment step and transverse drawing step.

Therefore, in order to adjust right-angled tearing strength in the longitudinal direction, irregularity of thickness in the width direction, solvent adhesive strength and haze of the heat-shrinkable polyester film into the range of the present invention, while considering the above-described interaction of steps each other, delicate adjustment of conditions such as the above-described (1) to (4) is required.

The package of the present invention is a package in which a label provided with perforations using the foregoing heat-shrinkable polyester film as a base material is coated at least on a part of the outer circumference and heat-shrunk, and as an object of the package, to start with PET bottles for beverage, various kinds of bottles and cans, plastic containers for confectionary or lunch bag etc., paper box and the like can be listed (hereinafter, these are collectively referred to as a packaging object). In general, in the case where a label using a heat-shrinkable polyester film as a base material is coated on the packaging object and heat-shrunk, the label is heat-shrunk by about 2 to 15% and closely attached on the package. Additionally, a label coated on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention is described in more detail by Examples, but the present invention is by no means limited to aspects of the Examples, and it can be suitably modified in the range not departing from the scope of the present invention.

Evaluation methods using in the present invention are as follows.

Intrinsic Viscosity [IV]

The intrinsic viscosity was determined by the use of Ostwald viscometer at 30±0.1° C. in which accurately weighed 0.1 g of a sample (chip or film) was dissolved in 25 ml of a solvent mixture of phenol: tetrachloroethane at a ratio of 3:2 (by mass ratio). Intrinsic viscosity [η] is calculated according to the following equation (Huggins equation).

$$|\eta| = \lim_{c \to 0}(\eta sp / C)$$ [Numerical formulas 1]

$$\eta sp / C = |\eta| + k|\eta|^2 C$$

$$\eta sp = (t - t_0)/t_0$$

Herein, $\eta_{sp}$ is a specific viscosity; $t_0$ is a solvent falling time in Ostwald viscometer; t is a solution falling time in Ostwald viscometer; and C is a concentration of the solution. In real measurement, the intrinsic viscosity was calculated by the following approximate equation, i.e., the Huggins equation wherein k is 0.375.

$$\eta = \eta sp + 1 = t/t_0$$ [Numerical Formulas 2]

$$[\eta] = 1/1.6|(\eta r - 1) + 3 \times \ln \eta r|$$

Herein, $\eta_r$ is a relative viscosity.

[Heat Shrinkage (Hot-Water Heat Shrinkage)]

A film was cut into a square of 10 cm×10 cm, treated and heat-shrunk in no load state for 10 seconds in hot water at a predetermined temperature±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)   Equation 1

[Right-Angled Tearing Strength]

Figure 1:
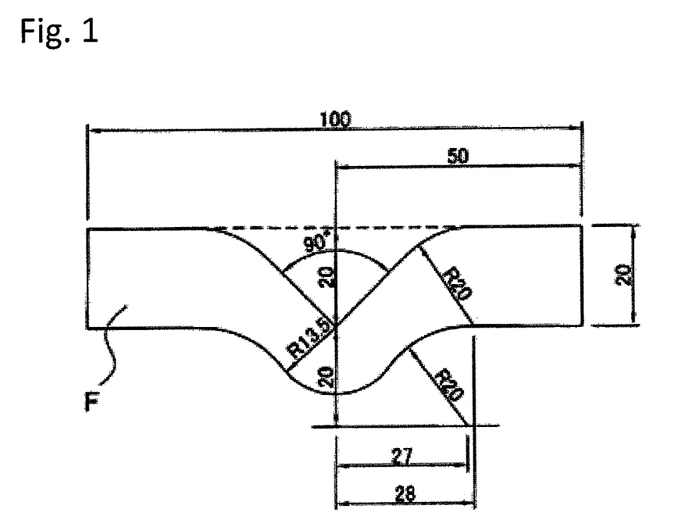
FIG. 1 is an explanatory drawing showing a shape of specimen in measurement of right-angled tearing strength (additionally, unit in length of each part of specimen in the figure is mm).

After a film was shrunk by 10% in the main shrinkage direction in hot water adjusted at 80° C., in accordance with JIS-K-7128, a specimen was produced by sampling in a shape shown in FIG. 1 (additionally, in sampling, longitudinal direction of the specimen was defined as the main shrinkage direction (width direction)). Thereafter, both edges of the specimen were held by a universal tensile tester (autograph manufactured by Shimadzu Corporation), the specimen was measured for strength at tensile break in a condition of tensile speed 200 mm/min, and the right-angled tearing strength per unit thickness was calculated using the following Equation 2.

Right-angled tearing strength=strength at tensile break/thickness   Equation 2

[Number of Initial Breakages]

Figure 2:
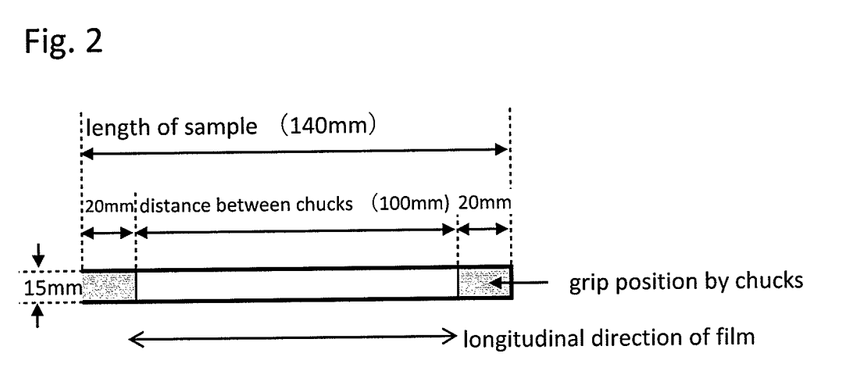
FIG. 2 is an schematic drawing showing a specimen in evaluation of the number of initial breakage.

A film was sampled in a rectangle of 140 mm in the longitudinal direction and 15 mm in the width direction. The sampled film was left for 4 weeks at a temperature of 30° C. and a humidity of 85%. The film was held at both ends of the test piece in the lengthwise direction using a universal tensile tester (the chuck grip position of one side: 20 mm, the distance between chucks: 100 mm), and a tensile test was carried out under conditions of a temperature of 23° C. and a tensile speed of 200 mm/min (see FIG. 2). The tensile test was repeated with 10 samples, and the number of times the samples were broken at not more than 5% elongation in the longitudinal direction of the film was obtained, which was referred to as the number of initial breakages.

[Irregularity of Thickness in Width Direction]

A film was sampled to a wide strip shape of 40 mm length× 1.2 m width, and by using a continuous contact thickness indicator manufactured by Micron Measurement Device Co., Ltd., thickness was continuously measured at a speed of 5 (m/min) along the width direction of the film sample (measuring length of 500 mm). At measurement, the maximum thickness, the minimum thickness and the average thickness were defined as Tmax., Tmin. and Tave., respectively, and the irregularity of thickness of the film in the longitudinal direction was calculated from the following Equation 3.

Irregularity of thickness={(Tmax.−Tmin.)/Tave.}×100 (%)   Equation 3

[Haze]

In accordance with JIS-K-7136, haze was measured by using a haze meter (300A, manufactured by Nippon Denshoku Industries Co., Ltd.). The measurement was carried out twice and the average was obtained.

[Irregularity of Thickness in Longitudinal Direction]

A film was sampled in a long roll of 12 m length×40 mm width, and by using a continuous contact thickness indicator manufactured by Micron Measurement Device Co., Ltd, thickness was continuously measured at a speed of 5 (m/min) along the longitudinal direction of the film sample (measuring length of 10 m). At measurement, the maximum thickness, the minimum thickness and the average thickness were written as Tmax., Tmin. and Tave., respectively, and the irregularity of thickness of the film in the longitudinal direction was calculated from the above-described Equation 3.

[Solvent Adhesive Strength]

1,3-Dioxolan was applied on a drawn film, and two pieces were bonded to seal. Thereafter, the seal part was cut into a width of 15 mm in the direction orthogonal to the main shrinkage direction of the film (hereinafter called orthogonal direction), which was set to a universal tensile tester S™-50 manufactured by Baldwin Corporation, and a 180° peel test was carried out in a condition of tensile speed 200 mm/min. Then, the tensile strength at that time was defined as the solvent adhesive strength.

[Solvent Penetration Resistance]

A film was cut into ten pieces of 5 cm squares, and five pieces of them were piled so that the inner surface of the wound roll faced upward. Thereafter, on the center part of the uppermost film of the piled films, a drop of 1,3-dioxolane (about 18 µL) was added. Immediately, five pieces of films were piled thereon so that the inner surface of the wound roll faced upward, and the laminate was wrapped with an aluminum foil to seal closely. This was stored at 40° C. for 24 hours in a state that a load of 2 kg was applied and then opened, and the number of pieces through which the solvent penetrated was counted. Then, the adhesion strength between the first piece and the second piece was measured at each of the upper and lower sides. Thereafter, evaluation was conducted according to the following criteria.

Good: adhesion strength is less than 0.2 N/15 mm

Fair: adhesion strength is not less than 0.2 N/15 mm and less than 1.0 N/15 mm

Poor: adhesion strength is not less than 1.0 N/15 mm

[Tg (Glass Transition Point)]

Using a differential scanning calorimeter manufactured by Seiko Instruments Inc. (model: DSC220), 5 mg of an undrawn film was heated at a heating-up speed of 10° C./min from −40° C. to 120° C., Tg was obtained from the thus obtained endothermic curve. Tangent lines were drawn in front of and behind the inflection point of the endothermic curve, and the intersection was defined as Tg (glass transition point).

[Shrinkage Strain of Label]

On a heat-shrinkable film, a three color-printing with green, gold and white ink of Toyo Ink Mfg Co., Ltd. was provided previously. By bonding both end parts of the printed film with dioxolan, a cylindrical-form label (label in which main shrinkage direction of the heat-shrinkable film was the circumferential direction) was produced. Thereafter, using a steam tunnel manufactured by Fuji Astec, Inc. (model: SH-1500-L), the label was attached by heat shrinkage on a PET bottle of 500 ml (trunk diameter 62 mm, minimum diameter of neck part 25 mm) at a zone temperature of 80° C. with a passing time of 2.5 seconds. In attachment, the neck part was adjusted such that the part of diameter 40 mm was placed on one edge of the label. The strain of upper part of attached label was measured with 360 degrees direction by using a gauge in order to evaluate appearance property after shrinkage, the maximum strain value was obtained. The criteria were as follows.

Good: the maximum strain is less than 2 mm

Poor: the maximum strain is not less than 2 mm.

[Label Adhesiveness]

A label was attached in the same condition as in the foregoing measuring condition of shrinkage appearance property. Then, when the label attached and PET bottle were lightly twisted, it was "good" in the case of no movement of label, and "poor" in the case of slide or out of alignment of the label and bottle.

[Perforation Opening Property]

A label to which perforations were previously provided in the direction orthogonal to the main shrinkage direction was attached on a PET bottle in the same condition as in the foregoing measuring condition of shrinkage finish property. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly torn along the perforations in the lengthwise direction thereby to be able to remove the label from the bottle was counted, the total samples of 50 minus the above number of bottles, and a ratio (%) relative to the total samples of 50 was calculated.

Properties and compositions of polyester raw materials A to F used in Examples and Comparative Examples are shown in Table 1. Further mixture compositions of polyester resins used in Examples and Comparative Examples, compositions of films obtained in Examples and Comparative Examples, and production conditions of films in Examples and Comparative Examples are shown in Table 2(2-1, 2-2). In the Tables, "TPA", "EG", "BD", "NPG", and "CHDM" are terephthalic acid, ethylene glycol, 1,4-butanediol, neopentyl glycol, 1,4-cyclohexanedimethanol, respectively. Further in Examples and Comparative Examples, the amorphous raw material ratio by mass % was calculated considering polyester raw materials B and E as amorphous raw material.

TABLE 1

| Polyester raw material | Raw material composition of polyester (mol %) | | | | | Added mount of lubricant (ppm) | Restrict Viscosity (IV) (dl/g) |
|---|---|---|---|---|---|---|---|
| | Dicarboxylic acid | Polyhydric alcohol component | | | | | |
| | TPA | EG | BD | NPG | CHDM | | |
| A | 100 | 100 | — | — | — | | 0.7 |
| B | 100 | 70 | — | 30 | — | | 0.7 |
| C | 100 | — | 100 | — | — | | 1.2 |
| D | 100 | 100 | — | — | — | | 0.65 |
| E | 100 | 70 | — | — | 30 | | 0.7 |
| F | 100 | 100 | — | — | — | 7000 | 0.7 |

TABLE 2

| | Resin composition | | Amorphous raw material ratio (mass %) | | Amount of amorphous monomer component (mol %) | | | Restrict Viscosity (IV) (dl/g) | | |
|---|---|---|---|---|---|---|---|---|---|---|
| | Core Layer | Skin Layer | Core Layer | Skin Layer | Core Layer | Skin Layer | Whole Film | Core Layer | Skin Layer | Whole Film |
| Example. 1 | B/C/D/F = 31/10/53/6 | A/B/C/F = 9/75/10/6 | 31 | 75 | 9.3 | 22.5 | 15.9 | 0.63 | 0.68 | 0.65 |
| Example. 2 | B/C/D/F = 31/10/53/6 | A/B/C/F = 9/75/10/6 | 31 | 75 | 9.3 | 22.5 | 15.9 | 0.63 | 0.68 | 0.65 |
| Example. 3 | B/C/D/F = 31/10/53/6 | A/B/C/F = 9/75/10/6 | 31 | 75 | 9.3 | 22.5 | 15.9 | 0.63 | 0.68 | 0.65 |
| Example. 4 | B/C/D/F = 31/10/53/6 | A/B/C/F = 9/75/10/6 | 31 | 75 | 9.3 | 22.5 | 15.9 | 0.63 | 0.68 | 0.65 |
| Example. 5 | B/C/D/F = 31/10/53/6 | A/B/C/F = 9/75/10/6 | 31 | 75 | 9.3 | 22.5 | 15.9 | 0.63 | 0.68 | 0.65 |
| Example. 6 | B/C/D/F = 31/10/53/6 | A/B/C/F = 9/75/10/6 | 31 | 75 | 9.3 | 22.5 | 15.9 | 0.63 | 0.68 | 0.65 |
| Example. 7 | B/C/D/F = 22/10/53/15 | B/C/F = 75/10/15 | 22 | 75 | 6.6 | 22.5 | 14.6 | 0.64 | 0.68 | 0.66 |
| Example. 8 | B/C/D/F = 76/10/8/6 | A/B/C/F = 54/30/10/6 | 76 | 30 | 22.8 | 9.0 | 15.9 | 0.67 | 0.68 | 0.67 |
| Example. 9 | C/D/E/F = 10/53/31/6 | A/C/E/F = 9/10/75/6 | 31 | 75 | 9.3 | 22.5 | 15.9 | 0.63 | 0.68 | 0.65 |
| Example. 10 | A/C/E = 9/10/81 | A/C/E = 9/10/81 | 81 | 81 | 24.3 | 24.3 | 24.3 | 0.68 | 0.68 | 0.68 |
| Example. 11 | B/C/D/F = 31/10/53/6 | A/B/C/F = 9/75/10/6 | 31 | 75 | 9.3 | 22.5 | 15.9 | 0.63 | 0.68 | 0.65 |
| Comparative Example 1 | B/C/D/F = 31/10/53/6 | A/B/C/F = 9/75/10/6 | 31 | 75 | 9.3 | 22.5 | 15.9 | 0.63 | 0.68 | 0.65 |
| Comparative Example 2 | A/B/C/F = 31/53/10/6 | A/B/C/F = 31/53/10/6 | 53 | 53 | 15.9 | 15.9 | 15.9 | 0.68 | 0.68 | 0.68 |
| Comparative Example 3 | B/C/D/F = 31/10/53/6 | A/B/C/F = 9/75/10/6 | 31 | 75 | 9.3 | 22.5 | 15.9 | 0.63 | 0.68 | 0.65 |
| Comparative Example 4 | A/B/C/F = 64/20/10/6 | A/B/C/F = 64/20/10/6 | 20 | 20 | 6.0 | 6.0 | 6.0 | 0.68 | 0.68 | 0.68 |

| | Lengthwise drawing step | | Intermediate heat treatment step | | Forced cooling step | Transverse drawing step | | Final heat treatment step | |
|---|---|---|---|---|---|---|---|---|---|
| | Preheat temperature (° C.) | Drawing ratio | Temperature (° C.) | Time (sec) | Film temperature (° C.) | Drawing temperature (° C.) | Drawing ratio | Temperature (° C.) | Time (sec) |
| Example. 1 | 85 | 1.5 | 130 | 10 | 80 | 75 | 4 | 85 | 10 |
| Example. 2 | 85 | 1.1 | 125 | 10 | 80 | 75 | 4 | 85 | 10 |
| Example. 3 | 85 | 1.1 | 110 | 10 | 80 | 75 | 4 | 85 | 10 |
| Example. 4 | 85 | 1.7 | 140 | 10 | 80 | 75 | 4 | 85 | 10 |
| Example. 5 | 85 | 1.7 | 130 | 10 | 80 | 75 | 4 | 85 | 10 |
| Example. 6 | 85 | 1.5 | 130 | 10 | 90 | 75 | 4 | 85 | 10 |

TABLE 2-continued

| | | | | | | | | | |
|---|---|---|---|---|---|---|---|---|---|
| Example. 7 | 85 | 1.5 | 130 | 10 | 80 | 75 | 4 | 85 | 10 |
| Example. 8 | 85 | 1.5 | 130 | 10 | 80 | 75 | 4 | 85 | 10 |
| Example. 9 | 85 | 1.5 | 130 | 10 | 80 | 70 | 4 | 85 | 10 |
| Example. 10 | 85 | 1.5 | 130 | 10 | 80 | 70 | 4 | 85 | 10 |
| Example. 11 | 85 | 1.8 | 150 | 10 | 75 | 70 | 4 | 85 | 10 |
| Comparative Example 1 | None | | None | | None | 80 | 3.9 | 78 | 10 |
| Comparative Example 2 | 80 | 1.2 | 95 | 10 | None | 80 | 4 | 83 | 10 |
| Comparative Example 3 | 85 | 1.5 | 100 | 10 | 80 | 75 | 4 | 85 | 10 |
| Comparative Example 4 | 85 | 1.5 | 130 | 10 | 80 | 75 | 4 | 85 | 10 |

Examples 1 to 11, Comparative Examples 1 to 4

In each example and comparative example, for the thickness of the final film to be 45 μm, the discharge amount was adjusted in such way that the thickness of the undrawn film is adjusted beforehand according to the setup of lengthwise and transverse drawing ratios.

Example 1

A resin for forming a core layer was molten in a single screw extruder (first extruder) and also a resin for forming a skin layer was molten in a single screw extruder (second extruder). These molten resins were laminated in a three-layer T die and extruded utilizing coextrusion and then cooled rapidly, thereby obtaining an undrawn film of 270μ thickness having a three layer structure of skin layer/core layer/skin layer. As the resin for forming a core layer, there was used a polyester resin containing 31 mass% of a polyester B (IV=0.70 dl/g), 10 mass% of a polyester C (IV=1.20 dl/g), 53 mass% of a polyester D (IV=0.65 dl/g) and 10 mass% of a polyester F (IV=0.70 dl/g). As the resin for forming a skin layer for both the front and back surfaces, there was used a polyester resin containing 9 mass% of the polyester A (IV=0.70 dl/g), 75 mass% of the polyester B, 10 mass% of the polyester C of and 6 mass% of the polyester F.

In producing the undrawn film, the moisture contents of polyester resin chips before being fed to hoppers of the first extruder for forming a core layer and the second extruder for forming a skin layer were each adjusted to 30 ppm. In addition, in producing the undrawn film, the screw of each extruder was cooled with circulation water. Further, in producing the undrawn film, the preheating temperature of each extruder was adjusted to 265° C., and the temperature of the compression zone in each extruder was adjusted to 300° C. In addition, in producing the undrawn film, the temperature of the first extruder for extruding a core layer was adjusted to 280° C., and the temperature of the second extruder for extruding a skin layer was adjusted to 275° C.

The thus obtained undrawn film of 270 μm in thickness was introduced into a lengthwise drawing machine in which a plurality of rolls were sequentially installed, and drawn in the lengthwise direction using the difference in rotation speeds between the rolls. That is, the undrawn film was preheated on a preheating roll till the film temperature reached 85° C., and then lengthwisely drawn by 1.5 times using the difference in rotation speeds between a low-speed rotating roll whose surface temperature was set at 85° C. and a high-speed rotating roll whose surface temperature was set at 30° C.

Thereafter, the undrawn film was heat-set at 130° C. and a wind speed of 18 m/S for 10 seconds in a state that the both ends in the width direction are held by clips in a tenter, introduced into a cooling zone, and cooled positively by blowing low-temperature wind till the surface temperature of the film reached 80° C. The film after cooling was introduced into a transverse drawing zone, and drawn at 75° C. by 4.0 times in the width direction (transverse direction).

Thereafter, the transversely drawn film was introduced into a final heat treatment zone in the tenter in a state that the both ends in the width direction are held by clips, and heat-treated at a temperature of 85° C. for 10 seconds in the final heat treatment zone. The film was then cooled, both ends were removed by cutting, and the film 400 mm in width was wound in a roll, thereby to continuously produce a biaxially drawn film of about 45 μm (thicknesses of skin layer/core layer/skin layer: 11.25 μm/22.5 μm/11.25 μm) over the predetermined length. The properties of the film obtained were evaluated by the foregoing method. The evaluation results are shown in Table 3. The biaxially drawn film obtained was evaluated to have a preferable heat shrinkage properties, a preferable perpendicular-tear strength and a small number of initial breakages, and it was comprehensively very preferable.

Example 2 a Biaxially Drawn Film was Obtained in the Same Manner as in Example 1 except that the thickness of the undrawn film was changed to 198 μm, the drawing ratio in the lengthwise drawing step was changed to 1.1 times and the temperature in the intermediate heat treatment step was changed to 125° C. In comparison with the biaxially drawn film of Example 1, the perpendicular tear strength was somewhat large, the number of initial breakages was somewhat large and the rejection rate of perforation opening was somewhat high, but the film was comprehensively preferable.

Example 3

A biaxially drawn film was obtained in the same manner as in Example 1 except that the thickness of the undrawn film was changed to 198 μm, the drawing ratio in the lengthwise drawing step was changed to 1.1 times and the temperature in the intermediate heat treatment step was changed to 110° C. In comparison with the biaxially drawn film of Example 1, the hot-water heat shrinkage in the longitudinal direction was somewhat large, the perpendicular tear strength was somewhat large, the number of initial breakages was somewhat large and the rejection rate of perforation opening was somewhat high, but the film was comprehensively preferable.

Example 4

A biaxially drawn film was obtained in the same manner as in Example 1 except that the thickness of the undrawn film was changed to 306 μm, the drawing ratio in the lengthwise drawing step was changed to 1.7 times and the temperature in the intermediate heat treatment step was changed to 140° C. In comparison with the biaxially drawn film of Example 1, the perpendicular tear strength was somewhat small, the number of initial breakages was 0, and the perforation opening property was also good, and the film was comprehensively preferable.

Example 5

A biaxially drawn film was obtained in the same manner as in Example 4 except that the temperature in the intermediate heat treatment step was changed to 130° C. In comparison with the biaxially drawn film of Example 4, the hot-water shrinkage in the longitudinal direction was somewhat large, but there was no problem in shrinkage strain in the label, the perpendicular tear strength was slightly small, the number of initial breakages was 0, and the perforation opening property was also good, and the film was comprehensively preferable.

Example 6

A biaxially drawn film was obtained in the same manner as in Example 1 except that the film surface was cooled down to only 90° C. in the forced cooling step. The thickness variation in the width direction was somewhat large, but the film was comprehensively preferable.

Example 7

A biaxially drawn film was obtained in the same manner as in Example 1 except that a polyester resin containing 22 mass % of the polyester B, 10 mass % of the polyester C, 53 mass % of the polyester D and 15 mass % of the polyester F was used as the resin for forming a core layer, and a polyester resin containing 75 mass % of the polyester B, 10 mass % of the polyester C and 15 mass % of the polyester F was used as the resin for forming a skin layer for front and back surfaces. In comparison with the biaxially drawn film of Example 1, the biaxially drawn film was somewhat high in haze value, but it was comprehensively preferable.

Example 8

A biaxially drawn film was obtained in the same manner as in Example 1 except that a polyester resin containing 76 mass % of the polyester B, 10 mass % of the polyester C, 8 mass % of the polyester D and 6 mass % of the polyester F was used as the resin for forming a core layer, and a polyester resin containing 54 mass % of the polyester A, 30 mass % of the polyester B, 10 mass % of the polyester C and 6 mass % of the polyester F was used as the resin for forming a skin layer for front and back surfaces. In comparison with the biaxially drawn film of Example 1, the biaxially drawn film was low in the amorphous raw material ratio, as a result the solvent adhesive strength was somewhat small, but it was comprehensively preferable.

Example 9

A biaxially drawn film was obtained in the same manner as in Example 1 except that the polyester B was changed to a polyester E (IV=0.70 dl/g) and the temperature in the transverse drawing step was changed to 70° C. When the amorphous monomer was changed, the biaxially drawn film was very preferable similar to the biaxially drawn film of Example 1.

Example 10

A biaxially drawn film was obtained in the same manner as in Example 1 except that a polyester resin containing 9 mass % of the polyester A, 10 mass % of the polyester C and 81 mass % of the polyester E was used as the resin for forming a core layer and a skin layer, and the temperature in the transverse drawing step was changed to 70° C. in comparison with the biaxially drawn film of Example 1, the hot-water shrinkage in the width direction was somewhat large, the perpendicular tear strength was slightly large, the solvent adhesive strength was slightly large because the amorphous raw material ratio of the biaxially drawn film was large in comparison with the biaxially drawn film of Example 1, the biaxially drawn film was preferable. The biaxially drawn film has slight problem in the solvent penetration resistance, but it was comprehensively preferable.

Example 11

A biaxially drawn film was obtained in the same manner as in Example 1 except that the thickness of the undrawn film was changed to 324 μm, the drawing ratio in the lengthwise drawing step was changed to 1.8 times and the temperature in the forced cooling step was changed to 75° C. In comparison with the biaxially drawn film of Example 1, the perpendicular tear strength was small, the number of initial breakages was 0 and the rejection rate of perforation opening was small, and the film was preferable.

Comparative Example 1

The thickness of undrawn film was adjusted to 175 μm. The transverse monoaxial drawing was conducted to the undrawn film without the lengthwise drawing step, the intermediate heat treatment step and the forced cooling step, and the transverse monoaxially drawn film of 45 μm was obtained. In comparison with the biaxially drawn film of Example 1, in the monoaxially drawn film, the perpendicular tear strength was large, the number of initial breakages was many and the rejection rate of perforation opening was large, and the film was not preferable.

Comparative Example 2

A biaxially drawn film was obtained in the same manner as in Example 1 except that a polyester resin containing 31 mass % of the polyester A, 53 mass % of the polyester B, 10 mass % of the polyester C and 6 mass % of the polyester E was used as the resin for forming a core layer and a skin layer, the thickness of the undrawn film was changed to 216 μm, the preheat temperature in the lengthwise drawing step was changed to 80° C., the drawing ratio in the lengthwise drawing step was changed to 1.2 times, the temperature in the intermediate heat treatment step was changed to 95° C., the temperature in the transverse drawing step was changed to 80° C., the drawing ratio in the transverse drawing step was changed to 3.9 times, the temperature in the final heat treatment step was changed to 78° C. In comparison with the biaxially drawn film of Example 1, the obtained biaxially drawn film has large heat shrinkage in the longitudinal direction, the shrinkage strain of the label was remarkable, and it was not preferable.

Comparative Example 3

A biaxially drawn film was obtained in the same manner as in Example 1 except that the temperature in the intermediate heat treatment step was changed to 100° C. In the obtained biaxially drawn film, in comparison with the biaxially drawn film of Example 1, the hot-water shrinkage in the longitudinal direction was large, the shrinkage strain of the label was remarkable, and it was not preferable.

Comparative Example 4

A biaxially drawn film was obtained in the same manner as in Example 1 except that a polyester resin containing 64 mass % of the polyester A, 20 mass % of the polyester B, 10 mass % of the polyester C and 6 mass % of the polyester E was used as the resin for forming a core layer and a skin layer. In comparison with the biaxially drawn film of Example 1, the obtained biaxially drawn film has small hot-water shrinkage in the width direction, it seemed the amorphous raw material ratio of the film was small, and it was not preferable in respect to the solvent adhesive strength and the label adhesiveness.

TABLE 3

| | Evaluation results | | | | | |
|---|---|---|---|---|---|---|
| | Hot-water shrinkage (%) | | | Number of initial breakages | Irregularity of thickness (%) | |
| | Width direction 95° C. | Longitudinal direction 80° C. | perpendicular-tear strength | (number/number) | Transverse direction | Lengthwise direction |
| Example. 1 | 63 | 2 | 340 | 1/10 | 9.5 | 10.2 |
| Example. 2 | 61 | −0.5 | 400 | 5/10 | 8.3 | 7.4 |
| Example. 3 | 60 | 4 | 405 | 5/10 | 8.1 | 7.1 |
| Example. 4 | 62 | 1.5 | 310 | 0/10 | 10.8 | 13.5 |
| Example. 5 | 62 | 4 | 320 | 0/10 | 10.4 | 13 |
| Example. 6 | 60 | 0.5 | 340 | 1/10 | 16.5 | 10.5 |
| Example. 7 | 63 | 1.5 | 345 | 1/10 | 9.5 | 10.2 |
| Example. 8 | 62 | 2 | 350 | 1/10 | 9.9 | 10.4 |
| Example. 9 | 64 | 3 | 340 | 1/10 | 10.1 | 10.6 |
| Example. 10 | 70 | 2 | 315 | 2/10 | 11.8 | 11.5 |
| Example. 11 | 62 | −1 | 310 | 0/10 | 10.4 | 12 |
| Comparative Example 1 | 60 | 1 | 430 | 9/10 | 8 | 7 |
| Comparative Example 2 | 58 | 7.5 | 395 | 2/10 | 8 | 8.9 |
| Comparative Example 3 | 60 | 9 | 370 | 1/10 | 9.3 | 9.4 |
| Comparative Example 4 | 30 | 3.5 | 380 | 0/10 | 7.5 | 6.5 |

| | Evaluation results | | | | | | |
|---|---|---|---|---|---|---|---|
| | Haze (%) | Solvent adhesive strength (N/mm) | Thickness of film (μm) | Solvent penetration resistance | Label adhesiveness | Shrinkage strain of label | Rejection rate of perforation opening |
| Example. 1 | 6.2 | 4.1 | 45 | Good | Good | Good | 18 |
| Example. 2 | 6 | 4.2 | 45 | Good | Good | Good | 30 |
| Example. 3 | 6 | 4.2 | 45 | Good | Good | Good | 30 |
| Example. 4 | 6.9 | 3.9 | 45 | Good | Good | Good | 14 |
| Example. 5 | 6.4 | 4 | 45 | Good | Good | Good | 14 |
| Example. 6 | 6.2 | 4.1 | 45 | Good | Good | Good | 18 |
| Example. 7 | 13.0 | 4.1 | 45 | Good | Good | Good | 18 |
| Example. 8 | 6.4 | 1.8 | 45 | Good | Good | Good | 18 |
| Example. 9 | 5.1 | 4.3 | 45 | Good | Good | Good | 18 |
| Example. 10 | 6.2 | 5.5 | 45 | Fair | Good | Good | 18 |
| Example. 11 | 7.8 | 3.7 | 45 | Good | Good | Good | 14 |
| Comparative Example 1 | 6 | 4.2 | 45 | Good | Good | Good | 40 |
| Comparative Example 2 | 6.2 | 3.5 | 45 | Good | Good | Poor | 28 |
| Comparative Example 3 | 6 | 4.1 | 45 | Good | Good | Poor | 22 |
| Comparative Example 4 | 6 | 0.8 | 45 | Good | Poor | Good | 26 |

INDUSTRIAL APPLICABILITY

The heat-shrinkable polyester film of the present invention has excellent processing properties as describe above, thus it can be used suitably as a label application for bottles. The package be attached the label shows a good appearance.

EXPLANATION OF REFERENCE NUMERALS

F—Film

The invention claimed is:

1. A process for producing a heat-shrinkable polyester film comprising the following steps (a) to (e) with respect to an undrawn polyester film prepared from a polyester resin component comprising (i) a polyester resin with ethylene terephthalate as the main constituent and (ii) at least 13 mol% of at least one monomer component capable of forming an amorphous component in the polyester resin component:
   (a) a lengthwise drawing step of drawing the undrawn film at a temperature of not less than 75° C. and not more than 100° C. by not less than 1.1 times and not more 1.8 times in the longitudinal direction;
   (b) an intermediate heat treatment step of heat-treating the film after the lengthwise drawing at a temperature of not less than 110° C. and not more than 150° C. for not less than 7 seconds and not more than 28 seconds in a state of holding both ends in the width direction by clips in a tenter;
   (c) a forced cooling step of positively cooling the film after the intermediate heat treatment till the surface temperature becomes a temperature of not less than 70° C. and not more than 90° C.;
   (d) a transverse drawing step of drawing the film after the forced cooling at a temperature of not less than 65° C. and not more than 90° C. by not less than 3.5 times and not more than 5.0 times in the width direction; and
   (e) a final heat treatment step of heat-treating the film after the transverse drawing at a temperature of not less than 80° C. and not more than 100° C. for not less than 5 seconds and not more than 30 seconds in a state of holding both ends in the width direction by clips in a tenter,
wherein the heat-shrinkable polyester film satisfies the following requirements (1) to (4):
(1) the hot-water shrinkage in the longitudinal direction is not less than −2% and not more than 4% when the heat-shrinkable polyester film is treated in hot water of 80° C. for 10 seconds;
(2) the hot-water shrinkage in the width direction is not less than 50% and not more than 80% when the heat-shrinkable polyester film is treated in hot water of 95° C. for 10 seconds;
(3) the number of initial breakages, which is the number of breakages before 5% extension, is not more than 7 when the heat-shrinkable polyester film is repeatedly subjected to a tensile test 10 times in the longitudinal direction using a tensile tester with a distance between chucks of 100 mm after being aged in an atmosphere of 85%RH at 30° C. for 672 hours; and
(4) the perpendicular tear strength to the longitudinal direction per unit thickness is not less than 300 N/mm and not more than 410 N/mm after the heat-shrinkable polyester film is shrunk by 10% in the width direction in hot water of 80° C.

2. The process of claim 1, wherein the heat-shrinkable polyester film has a solvent adhesive strength of 2 N/15mm width or more and 10 N/15mm width or less.

* * * * *